United States Patent [19]

Marwick

[11] 4,344,913
[45] Aug. 17, 1982

[54] CONTAINED NUCLEAR EXPLOSION BREEDER REACTOR SYSTEM

[76] Inventor: Edward F. Marwick, 5149 W. Morse Ave., Skokie, Ill. 60076

[21] Appl. No.: 40,849

[22] Filed: May 21, 1979

Related U.S. Application Data

[63] Continuation-in-part of Ser. No. 953,166, Oct. 20, 1978, which is a continuation-in-part of Ser. No. 810,894, Jun. 28, 1977, Pat. No. 4,121,971, which is a continuation-in-part of Ser. No. 544,178, Jan. 27, 1975.

[51] Int. Cl.$^3$ ............................................... G21C 9/00
[52] U.S. Cl. ..................................... 376/317; 376/102; 376/914
[58] Field of Search ..................... 176/9, 39, DIG. 1; 376/102, 317, 914

[56] References Cited

U.S. PATENT DOCUMENTS 3,659,649  5/1972  Dunlap ................................. 176/39
4,121,969  10/1978  Marwick ................................. 176/9
4,121,971  10/1978  Marwick ................................. 176/9

OTHER PUBLICATIONS

The Los Alamos Primer, LA-1, Serber et al., (4/43), pp. 21-24.
Exploding Reactors for Power by Edward F. Marwick, (1/27/73), Julia Marwick Books, 320 Happ Rd., Northfield, Ill. 60093, pp. 1-40.

*Primary Examiner*—Sal Cangialosi
*Attorney, Agent, or Firm*—Joel D. Talcott

[57] ABSTRACT

A large free-falling mass with a hollow vertical hole therethrough is intercepted by a smaller sub-critical high velocity downward traveling mass and with a smaller sub-critical high velocity upward traveling mass. A resulting explosion is contained within a large chamber which contains much molten sodium spray which attenuates the effects of the explosion and absorbs the explosion's energy and debris. The heated molten sodium with debris provides useful thermal energy to a heat exchanger means and materials for new masses and for new assemblies that are manufactured from precipitate therefrom. The reactor system is a net consumer of plutonium and converts spent enriched uranium LWR fuels into enriched (mostly of $U^{233}$) uranium by the neutron irradiation of thorium.

46 Claims, 3 Drawing Figures

U.S. Patent   Aug. 17, 1982   Sheet 2 of 2   4,344,913
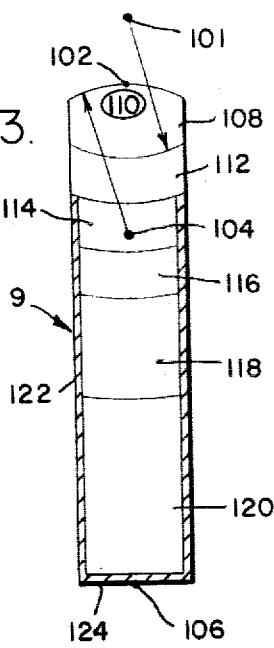
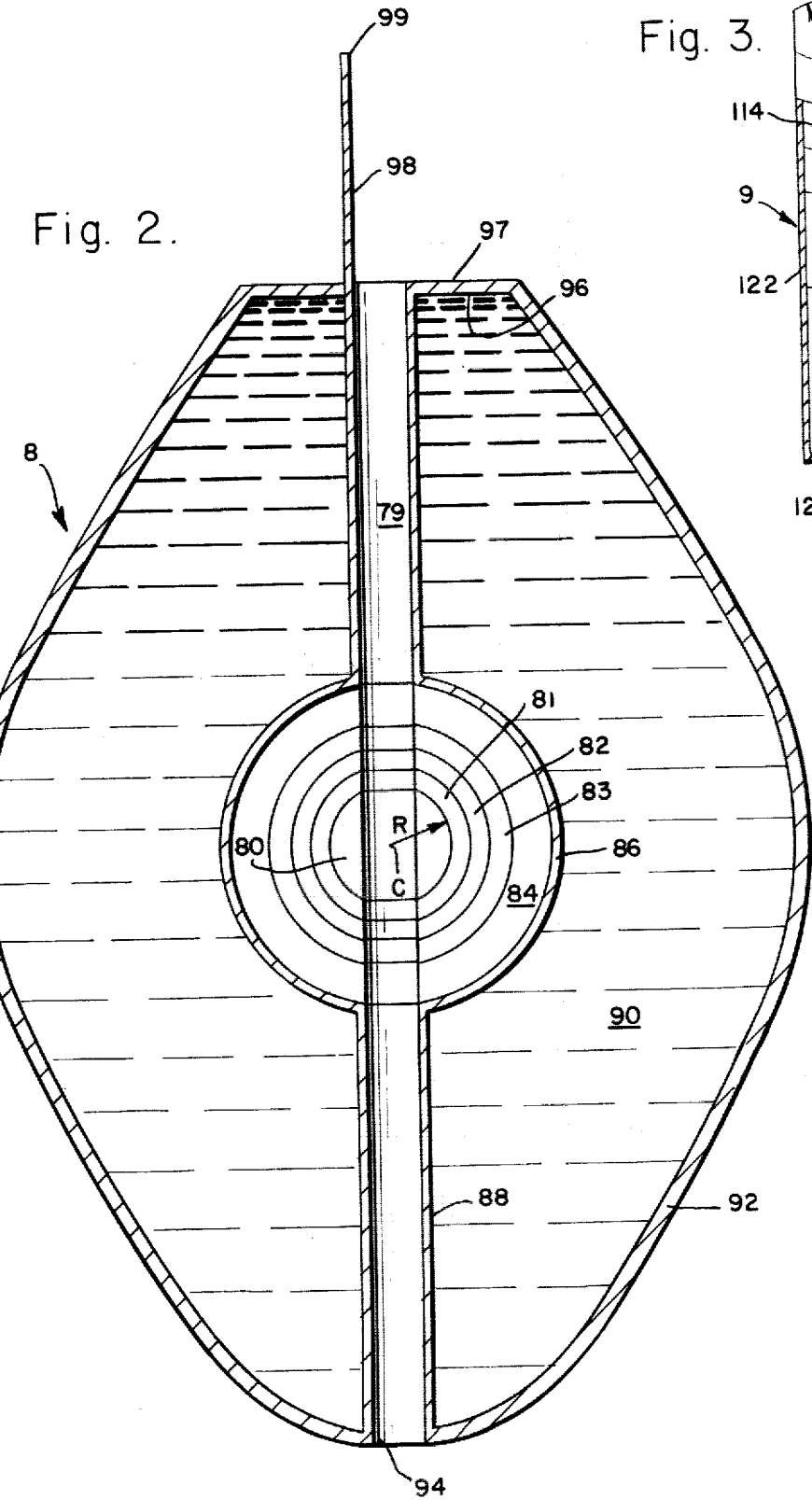

CONTAINED NUCLEAR EXPLOSION BREEDER REACTOR SYSTEM

This is a continuation-in-part of my application Ser. No. 953,166 filed Oct. 20, 1978, which is, in turn, a continuation-in-part of my application Ser. No. 810,894, filed June 28, 1977, now U.S. Pat. No. 4,121,971 issued Oct. 24, 1978, which is itself a continuation-in-part of application Ser. No. 544,178 filed Jan. 27, 1975 by Edward F. Marwick and Nis H. Juhl.

This invention pertains to a nuclear reactor system for producing useful thermal energy and valuable nuclear materials, such as $U^{233}$ enriched uranium, by irradiation by neutron pulses, preferably resulting from nuclear explosions produced in a large containing chamber seriatum. Useful thermal energy is withdrawn from explosion-heated, very lean molten sodium slurry.

In addition, neutron irradiation produces useful materials which may be used to fabricate the massive free-falling mass and the two smaller high velocity slugs all of which produce the nuclear explosion upon assembly in the chamber. The upward traveling slug concurs with the downward traveling slug at about the center of a vertical hollow tube of the massive mass. About 3,000 tonnes (metric tons) of molten sodium spray will protect the containing walls from the effects of the centroidal nuclear explosion.

This invention addresses itself to a solution to the energy "crisis". With limited reserves of natural uranium and the current utilization of but 0.6% of the energy within such uranium by light water reactors (without plutonium and/or uranium recycle) the expanding use of enriched uranium for the increasing needs for energy and for the replacement of dwindling domestic fluid fossil fuels is not possible. By the practice of this invention, materials from spent enriched uranium light water reactor assemblies are converted into materials suitable for use in new enriched uranium fuel assemblies. Not only is useful thermal energy produced while plutonium and thorium are consumed; greater than a hundredfold increase in the potential utilization of our uranium ore reserves can result.

In the before mentioned U.S. patent application, Ser. No. 953,166, about $10^{11}$ joules of thermal energy is produced about every 20 seconds by all-fission explosions within a containing chamber. The explosion is produced when a large downward falling sub-critical mass concurs with a high velocity upward traveling smaller sub-critical mass and the resulting assembly is more than prompt critical.

About 300 tonnes of molten sodium slurry substantially surrounds the exploding assembly at the instant of explosion; the actinide atoms within this slurry absorb neutrons from the exploding assembly. The slurry also serves to reflect some neutrons back into the exploding assembly, absorb the debris and thermal energy of the explosion and shield the containing walls from the effects of the explosion.

This slurry is introduced into the chamber in the form of sprays, the release of which is suitably timed in relation to the explosion so that there is a substantial quantity of spray in close proximity to the exploding assembly. At the instant of explosion, most of the spray within 1.5 meters of the center point of the explosion is denser in actinide concentration. The actinides comprise about 15% isotopes of plutonium, the remainder being principally $U^{238}$.

In the preferred embodiment of U.S. Pat. No. 4,121,971 there is the production of about 16 billion joules of thermal energy with each burst every 8 seconds when a slowly falling target-mass of about 116 kg. is overtaken by a high velocity downward slug of about 19 kg. The assembly of the two sub-critical masses is more than prompt-critical and the "burst" is contained by about a hundred tonnes of sodium-actinide slurry with about 0.1% by actinides (plutonium rich in $Pu^{242}$, neptunium, americium, curium, etc.).

Also disclosed in that patent is the net breeding of plutonium with a system of about 25% plutonium and most of the balance being depleted uranium and having a "burst" of about 130 billion joules (using about 800 tonnes of sodium slurry).

In my U.S. Pat. No. 4,121,969 issued Oct. 24, 1978, a reactor is disclosed utilizing a peaceful all-fission nuclear explosive which is ignited by proximity to about 2,000 tons of sodium slurry with about 0.3% actinide (9% plutonium-90% uranium) content that produces a total of about 400 giga-joules of energy from explosions every ten seconds.

In all these before mentioned U.S. patents and patent applications there is a sodium-actinide slurry and that slurry absorbs the thermal energy produced by an all-fission nuclear explosion, contains atoms to be neutron irradiated, protects the chamber's walls from the effects of the explosion, collects debris from the explosion, is used to transfer useful thermal energy from the chamber into a heat-exchanger means, and is separated into leaner and into more dense slurries. The more dense slurry is either used for the fabrication of explosion assemblies or is processed for use of its constituent materials, the most important processing being the separation of molten sodium from the solid particles within the slurry which are mostly actinides. These particles as precipitate could be used as pressed or molded material for the manufacture of new nuclear explosive assemblies or for other useful purposes removed from the reactor.

Unless the prime purpose of a reactor system is the production of a slurry, such as is disclosed in the aforementioned U.S. Pat. No. 4,121,971, it is best to use a leaner slurry in larger inertial confinement nuclear explosion reactor systems. Specifically, there is less valuable material in a reactor system with leaner slurry, there will be fewer neutrons and photons reaching the walls of the containing chamber since there will be fewer actinide fissions in a leaner slurry, there will be less erosion of the inner sides of the walls, conduits, pumps, etc., a leaner slurry requires less pumping power per unit mass of slurry handled, and with many designs there will be a higher breeding ratio and/or there will be more useful material produced per unit of thermal energy. With a leaner slurry, the average particle thereof will tend to be much smaller and hence there will be less difficulty with clogging of material handling apparatus, such as spray nozzles.

Since there will be many materials (mostly fission products) dissolved within the very lean molten sodium slurry, the lean slurry could also be called a lean slurry-solution. With the exception of lithium dissolved within molten sodium, the dissolved materials therein will, for the most part, absorb neutrons in a wasteful manner.

Of course, if a leaner slurry is used, the explosive assembly should be made larger and the slurry spray will react nucleonicly less with the exploding assembly.

The size of the nuclear explosive assembly or the fissile material composition of the assembly need not increase appreciably as the magnitude of the explosion is increased. Likewise the manufacturing means for the parts of the assembly and the apparatus for the handling, dropping, and/or accelerating the assembly part or parts do not increase appreciably as the magnitude of the explosion is increased. Thus, it may be highly advantageous to utilize as large an explosion as may be safely accommodated by the reactor.

With larger nuclear explosion reactor systems, there must be more protective slurry between the explosion and the containing chamber's walls. Hence there would be less neutron, photon, and other nuclear explosive damaging effects upon such walls. If the magnitude of the explosion is increased roughly eight times and eight times as much slurry is used, the diameter of the changer is doubled (the volume therein being increased eight times). However, the inner surface of the containing chamber's walls is increased only by a factor of four.

With larger nuclear explosions, a higher fraction of atoms within the assembly will be neutron irradiated and hence there will be a lower doubling time for fissile material within the reactor system.

With fusion explosion systems, larger explosions will use a greater percentage of deuterium and thus require a lower fraction of tritium, which is both expensive and highly radioactive and a large enough system, designed not to use lithium, might produce more tritium than is consumed. With the ignition of a small centroidal target of a fusion explosion system, not much more energy pulses are needed for the ignition of a larger explosion than is needed for a much smaller explosion.

Likewise, with a multilayered centroidal fusion explosion device, a much greater fraction of the atoms therein will be used with a larger explosive device. For example, not much more beryllium metal is needed to encase a ten-fold larger energy fusion explosion system than with a smaller system. In fact, it seems that the optimum size for such a mostly fusion inertial confinement explosive reactor would be on the order of magnitude of $10^{13}$ joules of energy per explosion. One reactor system could supply most of the world with uranium enriched in $U^{233}$.

The large all-fission contained explosion reactor, such as disclosed in this invention, is a precurser of a massive fusion explosion system. Before there is a commitment to a fusion system costing more than $10^{11}$ dollars, there must be experience and certainty of many things such as: (a) the handling of alkali metal slurries with actinides and fission products therein; (b) the processing of irradiated actinides and the fabrication of large assemblies; and (c) the programmed dropping large quantities of molten alkali metal in conjunction with the nuclear explosion means. Such experience may be gained through the use of the reactor of this invention.

For a total energy production of about $10^{12}$ joules every 20 seconds by an all-fission nuclear explosion in a large resuable containing chamber, an explosive assembly is designed of three sub-critical masses. These masses are so constructed that at the instant super-criticality, the centroidal portion is of plutonium-rich actinide metal which is surrounded by an inner shell of uranium-rich actinide metal. In turn there are successive surrounding layers of mostly uranium hydride, mostly thorium hydride, magnesium and thorium hydrides, mostly magnesium hydride, magnesium metal, molten sodium (containing some thorium, magnesium, hydrogen, uranium, and other actinides), and magnesium metal. This assembly is then surrounded within the containing chamber by about 3,000 tonnes of molten sodium spray which absorbs most of the shock-blast of the explosion as well as the energy and debris from the explosion. This spray also absorbs neutrons and most powerful photons which escape from the exploding assembly.

The largest of the three sub-critical masses preferably has an average radius in excess of one meter and has a hollow vertical tube with a diameter of 11 cm through its center and through the concentric spherical layers which form the mass. Surrounding these layers is molten sodium slurry-solution containing atoms of hydrogen, magnesium, thorium, uranium, fission products, and other actinides all in various compounds, ions, and metal particulates and held within an outer thin shell which is made of magnesium.

The two sub-critical slugs each are of cylindrical shape with a preferred average diameter of about 10 cm and length of about 40 cm. A small front portion of these slugs is mostly of plutonium metal and is backed by layers corresponding to those of the large mass. The center and back portions consist mostly of magnesium hydride and sodium hydride.

The large mass is dropped and free-falls toward the center of the chamber. The two slugs are accelerated to high velocities in opposite directions and are programmed to concur in about the center of the hollow within the large mass. A neutron-producing burst results when the two slug and massive mass concur and valuable thermal energy and isotopes are produced. If a sufficient degree of criticality is achieved, as in the preferred embodiment, an explosion results. However, even if an explosion does not occur, the reusability of materials permits the reactor of this invention to be effectively used for the production of thermal energy and isotopes.

The debris of the explosion is entrapped within the heated molten sodium and is withdrawn by precipitation from the sodium which is cooled by heat-exchanging means. Collected debris is further processed to obtain materials for new slugs and masses while the cooled molten sodium is used for spray with successive explosions.

A better understanding of this invention will be gained when the following detailed description is read in conjunction with the appended drawings, wherein:

FIG. 2 is a cross-sectional view of a large mass for use in the reactor system of FIG. 1; and FIG. 3 is a cross-sectional view of a slug for use in the reactor system of FIG. 1.

Figure 1:
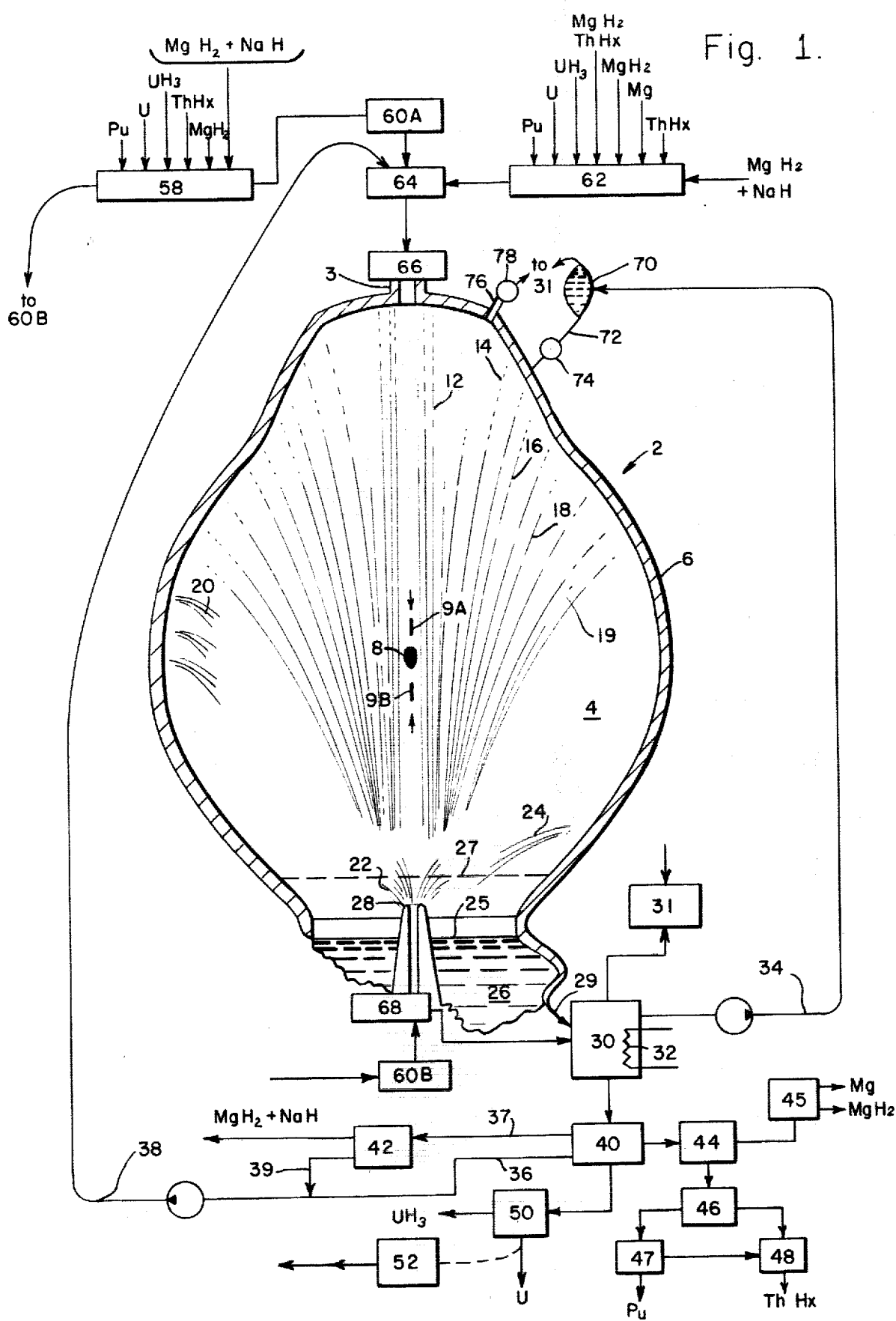
FIG. 1 is a schematic diagram of the reactor system of this invention with a reactor chamber thereof being shown in cross-section.

Referring now to FIG. 1, a reactor 2 of this invention has a large chamber 4 which is somewhat ellipsoidal with a maximum horizontal diameter of about 60 meters and having containing walls 6 with an average thickness of about two meters. At the top of the chamber 4 is a neck 3 having shutter means 66 for closing off the neck 3 in a manner to be subsequently described herein. A pool 26 of slurry forms during operation of the reactor 2 at the bottom of chamber 4, the distance from the shutter means 66 to a surface 25 of the pool 26 (at the instant of explosion) preferably being about 78 meters.

A free-falling large mass 8, described in detail in connection with FIG. 2, is shown at about its position of concurrence with a slug 9A (FIG. 3) which is traveling at high velocity downward and with a slug 9B which is traveling at high velocity upward, the slugs being illustrated before concurrence with mass 8. Surrounding the exploding assembly (8, 9A, and 9B) are a great plurality of sprays, exemplified by sprays 12, 14, 16, 18, 19, 20, 22, and 24, which protect the walls of the chamber from the effects of the explosion and absorb the energy of the explosion by being heated thereby.

The spray is made up of two types of sprays. Spray streams such as sprays 12, 14, 16, 18, and 19 are from conduit openings which are on the order of a decimeter in diameter; finer sprays, such as sprays 20, 22, and 24 come from nozzles which have openings which are on the order of a centimeter in diameter. At the instant of explosion, most of the sprays from the spray streams are nearer to the explosion than are the finer sprays.

The spray streams 12 fall straight downwardly and, assuming entry into the chamber at a velocity of 3.0 meters per second, will fall about 15.5 meters in 1.5 seconds and 65.3 meters in 3.5 seconds. If a spray stream 12 is started (valve opened) some 3.5 seconds before the explosion and turned off (valve closed) some 1.5 seconds before the explosion, at the instant of explosion the spray stream will have a length of about 50 meters curtaining the voided cylindrical region along the vertical central axis of the chamber. If the conduit opening is 1 dm$^2$ in cross-sectional area, in some 2 seconds at a velocity of 3 meters/second, 60 liters of liquid enters the chamber and is stretched out into a volume (assume no horizontal scattering) of some 500 liters; thus, the resulting 50 meter long column with a cross-section of 1 dm$^2$ is about 12% of liquid.

Moving outwardly from the center-line, surrounding sprays 12 there are a greater plurality of stream sprays 14 which have an average entering downward velocity of about 2.8 meters per second and a horizontal velocity directed towards the center-line of about 1.1 meters per second. If such a spray enters the chamber 4.1 meters from the center-line, 3.5 seconds later it will be but 0.25 meters from the center-line and over 10 meters below the point of explosion of the assembly. These stream sprays 14 will tend to bunch somewhat inwardly with the stream sprays 12.

The stream sprays 16 have an average inward horizontal velocity upon entering the chamber of about 1.6 meters per second while stream sprays 18 average some 2.1 meters per second of inward velocity and the stream sprays 19 have an average inward horizontal velocity of about 2.7 meters per second.

These stream sprays have a total mass of about 2,000 tonnes and are programmed to maximize the "bunching" in the volume surrounding the exploding assembly. Great care must be taken so that no spray comes in contact with the falling mass 8 or with the high velocity slugs 9A and 9B.

A plurality of fine sprays 20 scatter into droplets after traveling two or three meters from the walls. There are also fine sprays 22 which protect lips 28 at the bottom of chamber 4 and fine sprays 24 which cover the chamber's pool 26. Additional fine sprays (not shown) may be used to protect the upper shutter means 66. These fine sprays have a total mass of about 1,000 tonnes and are mostly within 5 meters of the walls at the instant of explosion.

A substantial difference between the sprays of this invention and the spray systems of my previous U.S. patents and applications resides in the sprays of this invention containing relatively very little actinide in the form of slurry particulates. Also, the average size of such particulates within the sprays of this invention will be smaller than found in the slurry spray systems of the previous inventions. Thus erosion of the conduit walls, nozzles, and other system components will be substantially diminished.

Specifically, the average weight percentages of actinides within the sprays of this reactor will be a total of about 0.1%. Roughly there will be about 0.07% Th$^{232}$, 0.028% U$^{238}$, 0.0005% fissile uranium isotopes, 0.0012% plutonium isotopes, and 0.0003% of other actinide isotopes such as Th$^{234}$, Pa$^{233}$, U$^{234}$, U$^{236}$, and Np$^{237}$. These percentages will change greatly as a series of cycles transforms the spent uranium into "enriched" uranium. For example, the actinide will start with about 0.00023% fissile uranium (which is all U$^{235}$) and end with about 0.00021% of U$^{235}$ and roughly 0.00065% of U$^{233}$.

Also, in addition to sodium, the sprays will contain nonactinides having roughly a weight percentage of about 0.05% (mostly of magnesium but including materials such as hydrogen and some fission products). The hydrogen, which has an atomic percentage which is greater than that of all the actinides together, will be mostly in the form of hydrides of sodium, magnesium and actinides.

A few seconds after the explosion, the heated sodium spray increases the height of the surface 25 of the pool 26 to a level designated by the dashed line 27. A plurality of passageways 29 carry the liquid slurry to a plurality of heat exchanger-precipitating basins 30 wherefrom useful thermal energy is extracted by heat exchange means 32 and wherein much of the non-sodium atoms within the now-cooled sodium settle out towards the bottom as a thick slurry. The remaining cooled molten sodium is in the form of a very lean slurry which may be used again in the spraying system.

The thick slurry is transported to a prime separating means 40 wherein at first the slurry is settled and the leaner slurry on the upper portions is drawn off by conventional transport-withdrawal means 36.

Next, the remaining residue, which is mostly of hydrides of magnesium, sodium, and actinides mixed with sodium, magnesium and actinide metals, is all heated up. As the temperature rises, there will be decomposition of some of the hydrides and vaporization of the sodium therein. Later, there will be some vaporization of magnesium. All of these vapors and hydrogen gas are transported by transport means 37 to a prime hydriding means 42 where there is produced a mixture of MgH$_2$ and NaH and a sodium slurry containing NaH and MgH$_2$. This slurry is transported by transport means 39 to be mixed with the slurry in means 36. The resulting slurry mixture is transported by means 38 to a dropping means 64 for addition to the large mass 8 in a manner to be described.

Prime separating means 40 is left containing a molten magnesium solution rich in both thorium and plutonium and a residue which is mostly uranium. The solution is transported to a magnesium distilling means 44 while the uranium residue is transported to uranium processing and hydriding means 50.

The magnesium solution in the magnesium distilling means 44 is heated up so that the magnesium vapor travels to a magnesium processing, condensing, and hydriding means 45 while the residue is transported to a thorium-plutonium separating means 46. Magnesium has a vapor pressure of 400 mm of mercury at 1034° C. while pure thorium has a melting point of about 1750° C.

In the magnesium processing, condensing and hydriding means 45 there is produced molten magnesium metal and MgH$_2$ while in the thorium-plutonium separating means 46 thorium is separated from plutonium-thorium residue. This may be done by dissolving the residue from magnesium distilling means 44 by some material such as bismuth. Plutonium is much more soluble in bismuth than is thorium and most of the plutonium in the residue will be dissolved leaving a residue of purer thorium. This purer thorium is transported to the thorium hydriding means 48 after all of the bismuth remaining has been vaporized off. Bismuth has a vapor pressure of 400 mm of mercury at 1370° C. By distilling off the dissolving bismuth, the residue consists of mostly plutonium but with some thorium therein.

Although this plutonium rich plutonium-thorium alloy could be used for the centroidal parts of the explosive assembly, it would be best to further concentrate the plutonium since thorium has a poor fast neutron fission cross-section and, if used centroidally, there would need to be a larger centroidal section and also there would be the production of much U$^{232}$ which is undesirable for use in enriched uranium fuel fabrications.

Therefore, the plutonium rich material should be transported to a plutonium concentrating and thorium separating means 47. This separating may be done by the vapor distillation of plutonium (at temperature of 1800° C. or higher). Of course other separating means, such as the use of different dissolving metals, could be used for the separation of plutonium from thorium. The thorium thus separated is transported to a thorium hydriding means 48.

With special processing with bismuth, the thorium content of the plutonium concentrate could be as low as one part thorium to thirteen parts plutonium (after the bismuth has been distilled off). Thus the practitioner of this invention might elect to use such thorium-diluted plutonium in the practice of this invention and avoid the use of a plutonium distilling means 47 which may be otherwise required.

When the uranium within the system has reached a desired fraction proportion of fissile isotopes (mostly U$^{233}$) the uranium can be transported from means 50 to the enriched uranium processing means 52 wherein the uranium is purified and wherefrom the purified uranium is shipped out for such uses as the fabrication of light water fuel assemblies.

Not disclosed in the foregoing has been the handling and separating of the fission products thereabouts, of the movements of hydrogen gas, of the handling and separation of other actinides thereabouts. Such handling, processing and separating techniques are well-known to those skilled in such arts. Also, it should be noted that there can be modifications and alternate methods used in such handling, processing, and separating techniques without deviating from the broad concepts of this invention.

Referring now to FIG. 2, the large mass 8 has its shell and central portions manufactured in a large mass manufacturing means 62 (FIG. 1) from materials from processed in the processing means 45, 42, 48, and 50. Mass 8 is somewhat ellipsoidal in shape with a horizontal diameter of 1.8 meters and a vertical distance of 2.5 meters from bottom tips 94 of a central vertical tube 88 to the junction of struts 97 with the upper portion of the tube 88.

Through the center C of the mass 8 is a vertical void 79 with a diameter of 11 cm. In a ring shape about center point C with an outside radius R of 10 cm is an inner shell 80 which is formed of uranium metal. Surrounding shell 80 with a thickness of 5 cm is shell 81 which is substantially of UH$_3$.

Shell 81 is in turn surrounded by a 5 cm thick shell 82 which is mostly of thorium hydrides. The greatest proportion is of Th$_4$H$_{15}$ with some ThH$_2$ therein. Shell 83, which is also 5 cm thick, surrounds shell 82 and is a mixture of MgH$_2$ and thorium hydrides. The outermost shell 84 of the centroidal portions is 10 cm thick and is a mixture of MgH$_2$ and NaH.

These shells 81, 82, 83, and 84 are designed to obtain a maximization of fissioning of U$^{238}$ and of plutonium, a maximization of neutron reflection and moderation by the hydrogen atoms in hydrides, a minimization of the neutron stripping of Th$^{232}$ and the maximization of the neutron absorption of Th$^{232}$ for the production of U$^{233}$.

These shells are in the shape of rings with the limits of the other shells and of the hollow 79 delineating their shape. Surrounding shell 84 is shell 86 which is a half-centimeter thick and is of magnesium metal and is firmly attached to or formed integrally with both portions of the centimeter thick tube 88.

Attached to or formed integrally with the bottom tips 94 of the tube 88 and to the uppermost portions of the tube 88 (through struts 97) is a quarter centimeter thick shell 92 of magnesium metal. This shell 92 is fragile and generally of insufficient strength to support the forces of containing the slurry 90 if it were placed within it when it is at rest and not supported by the dropping means 64 (FIG. 1).

Also attached to the uppermost portions of the tube 88 are three guide shafts 99 of magnesium metal about a half meter long and each having a cross-sectional area of about one square centimeter. These guide shafts serve two purposes. When the mass 8 without slurry 90 therein is transported from the manufacturing means 62 to the dropping means 64, it will be supported by those guide shafts and by a suitable holding means (not shown) engaging the bottom tips 94 without damage to the shell 92. Further, when the mass 8 has been filled with slurry 90 and is dropped, very fine adjustments may be made to the falling mass 8 for the first 0.3 second of falling through the guide shafts.

The slug 9, which as downward traveling slug 9A and upward traveling slug 9B concur near the point C within the hollow 79 of the free-falling massive mass 8, is illustrated in FIG. 3. From the foremost point 102 of slug to a bottom-most point 106, both of which are on the center-line, is a length of about 40 cm. From point 101, which is on the center-line some 6 cm point 102 is a radial distance of 12 cm that delineates the bottom limit of the plutonium-rich foremost portion 108. From the point 104, which is 12 cm behind point 102 on the center-line is a radial length which delineates the front surface of the slug 9 (and the portion 108). Except for the curved front surface, the slug 9 is cylindrical in shape with a diameter of 10 cm.

In the forward region of the portion 108 is a hollow or very porous portion 110 whose volume is preferably about a third of so of the containing portion 108. Behind portion 108 and with a thickness of 4 cm is portion 112 which is of solid uranium metal.

Behind portion 112 and with a thickness of 4 cm is portion 114 of uranium hydride, which is in front of the 4 cm thick portion 116 of thorium hydrides. Behind portion 116 is an 8 cm thick portion 118 which is a mixture of magnesium hydride and thorium hydrides in front of a back portion 120 which is mixture of magnesium hydride and sodium hydride.

On the outer sides of the portions 114, 116, 118, and 120 is a shell 122 of magnesium metal a quarter centimeter thick. Likewise, the back 124 of portion 120 is also of quarter centimeter thick magnesium metal. The reason for shell 122 and back 124 is to give enough structural strength to the slug 9 so that it can withstand the tremendous forces required to produce very high acceleration. The outside diameter of shell 122 may be 10.2 cm so that with the operation of a gas "gun" acceleration means only the "softer" magnesium metal is in tight contact-movement with the barrel rather than some more abrasive actinide metal. This both prevents damage to the "gun" and provides better sealing to minimize gas leakage past the slug 9 during firing. This is required to assure precisely controlled concurrence of the slugs 9 and mass 8.

The slugs 9 are manufactured in a slug manufacturing means 58 (FIG. 1) with materials from the system's material processing means 42, 45, 47, 48 and 50 and are transported to a downward slug acceleration means 60A which accelerates the slugs 9A and to an upward slug acceleration means 60B which accelerates the slugs 9B.

By far the greatest material transporting within this reactor system is the pumping of 3,000 tonnes of cooled molten sodium from the plurality of basins 30 by a plurality of molten sodium transport means 34 to a plurality of spray holding basins 70.

The desired coordination of stream sprays and fine sprays is obtained by the opening and closing of a great plurality of valves such as 74 which controls conduit 72 from basin 70.

There are a plurality of openings 76 in the upper portion of the chamber 4 through which vapor and gases and some very fine spray and particulates escape when valves 78 are opened. These materials are transported to the separation means 31 wherein the gases hydrogen, helium, krypton, and xenon that are mixed with vapors of cesium, rubidium, and sodium together with molten sodium and particulates are separated out by means known to those skilled in such arts. Also transported to means 31 will be gases and vapors from basins 30 and 70.

The slug accelerating means 60A and 60B could either be of the gas gun type or of the mass driver type. If a gas gun is used, it can utilize either helium gas or hydrogen gas without detracting from the proper operation of the reactor system.

In order to have a total energy production of about $10^{12}$ joules from each explosion, it will be necessary that the slugs have a greater velocity than in the previous mentioned U.S. patents and U.S. patent applications. However, it should be noted that the uniquely designed system of this invention, wherein there are three subcritical masses concurring to produce a more than prompt-critical assembly, will produce an explosion of greater magnitude with less kinetic energy input into non-gravity accelerated slugs or masses than those designs heretofore disclosed.

Also with this unique design, more than prompt-criticality is avoided unless all three masses concur. Hence there is a greater safety factor in the operation of this invention. However, as is usual with nuclear materials, great care must be taken in the manufacture, transportation, and storage and processing of materials and the masses 8 and slugs 9 so that there is never any situation outside of the chamber 4 which produces any chance of assembly of a critical mass.

The shutter means 66 of this invention is very similar in principle to the upper shutter means disclosed in my U.S. Pat. No. 4,121,971 where the shutter means is opened wide to let the large free-falling target-mass through, then closes into a much smaller opening for the accelerated slug to then pass through and thereafter closes.

The bottom shutter means 68 of this invention is very similar in principle to the lower shutter means in both the U.S. patent applications Ser. Nos. 544,178 and 953,166. The bottom shutter means 68 also includes a drain means wherefrom molten sodium and debris from each explosion is drained from the upper portions of the slugs passageway that are above the means 68 before the passage of the slugs 9B for the next explosion. This drainage is transported to heat exchanger means 30.

Mass dropping means 64, besides dropping the mass 8 in a precise manner such that there is almost no twisting or turning in the falling mass 8, must hold the shell of the mass as it is being filled with slurry 90 in such a way that no distortion occurs in the shell 92 from the hydrostatic forces due to such slurry. Likewise, at the instant of dropping, the holding means must be entirely withdrawn in a manner which produces no mechanically produced distortion as the massive mass changes from a condition of being supported against gravity to a state where it is in free-fall.

A fragile shell containing much slurry may be used due to the fact that in free-fall there are no hydrostatic forces as would be found in a structure supported against gravity. The advantage of such a fragile structured mass 8 lies in the quickness of filling and the saving of time over what it would take to solidify the slurry, as well as the economy of fabricating a thin fragile shell.

Since there are many millimeters of leeway on either side of the concurring slugs with the inner surfaces of the tube 88, the properly fired slugs traveling into a correctly falling mass 8 will smash into each other before they contact the inner surfaces of the hollow 79. Even if one or both of the slugs should graze the inside surface of the hollow because of misalignment, the slugs will still have enough forward momentum so concurrence and an explosion will result. However, even if a super-critical explosion does not occur, a neutron burst producing both thermal energy and useful isotopes through neutron irradiation will result.

Also, if the tips 102 of the slugs 9A and 9B concur at a point several centimeters from the point C, an explosion of somewhat lower magnitude than planned or a neutron burst will occur. Note that the degree of criticality and the resulting magnitude of the explosions or bursts can be controlled by the velocity of the concurring slugs. Hence the slug accelerating means should be adjustable as to final velocities.

The slugs 9 and centroidal portions of the mass 8 should be made of such atomic and isotropic concentrations that the assembly becomes prompt-critical when the slugs are each about a centimeter from the point C in the hollow 79. When the points 102 of the slugs 9A and 9B touch each other, there will have been such heating of the portions 108 that they are either very plastic or in the molten phase. Thus, the collision will result in the portions 108 being splattered sideways into the unfilled portions of the hollow 79 near point C.

Because of the void 110 within the portions 108, the "k" of the concurring slugs will increase after their tips have squashed into each other. The momentum of the portions 112 of dense and high melting uranium especially will act as contracting tampers for the inertial confinement of the resulting all-fission nuclear explosion.

Because of the much greater concentration of fissionings therewithin, the portions 108 will be vaporizing before most of the portions 112 and 80 have melted. As the portions 112 and 80 are melting, the portions 81 and 82 will be exploding as the hydrogen gas disassociates from the actinide hydrides.

The function of the hydrogen as hydrides within the assembly is to act as a moderator and a reflector of neutrons. Note that if the neutrons have been moderated down to an energy level of between 10 ev and 30 ev, the (n, $\gamma$) cross-sections of $U^{238}$ are 56 barns while those of $Th^{232}$ are 40.7 barns. For most neutron energy ranges the scatter cross-section for hydrogen atoms is about 20 barns while for most actinides the value is about half of that. The reflection of neutrons back into portions 108 will cause more fissionings therein. Thus, the use of much hydrogen as hydrides in the shells 81, 82, 83, and 84 and portions 90, 114, 116, 118, and 120 greatly reduces the total magnitude of actinides needed for the whole assembly. Also, proportionally few neutrons will escape into the spray streams outside of the assembly.

In the resulting explosion, the whole assembly and some of the nearby stream sprays will be plasmatized (a result of temperatures in excess of $10^4$ degrees Kelvin) while hundreds of tonnes of stream sprays a little farther from the assembly will be vaporized. Most of such sodium vapor will condense upon nearby stream sprays and almost no sodium vapor will touch the chamber walls since such vapors will easily condense upon the finer sprays.

An abbreviated and simplified sequence of operations of a cycle of this invention's reactor system is as follows:

| (time 0.0 seconds is instant of maximum energy production) | |
|---|---|
| −18 sec. | empty large mass 8 is moved into dropping means 64 shutter means 66 is closed and debris, vapors and gases of previous explosion have been either blocked from entering or have been cleaned out of massive mass dropping means |
| −16 sec. | filling of the empty shell 92 large mass 8 with slurry "90" begins |
| −4 sec. | filling of mass 8 is completed and slurry filling means is withdrawn therefrom |
| −3.4 sec. | valves 78 are closed |
| −3.31 sec. | stream spray 12 starts to enter chamber 4 |
| −3.25 sec. | stream spray 14 starts to enter chamber 4 |
| −3.18 sec. | stream spray 16 starts to enter chamber 4 |
| −3.12 sec. | the filled mass 8 is dropped and starts to fall; the shutter means 66 is fully open |
| −3.11 sec. | stream spray 18 starts to enter chamber 4 |
| −2.1 sec. | stream spray 18 is terminated |
| −2.05 sec. | acceleration of slugs 9A and 9B which assume final velocity of 1,000 meters/second at average acceleration of 500 meters/second/second is commenced |
| −1.8 sec. | stream spray 16 is terminated |

-continued

| (time 0.0 seconds is instant of maximum energy production) | |
|---|---|
| −1.6 sec. | sprays 24 start entering chamber 4 |
| −1.4 sec. | stream spray 14 is terminated |
| −1.1 sec. | stream spray 12 is terminated |
| −1.0 sec. | fine spray 20 starts to enter chamber 4 |
| −0.9 sec. | fine spray 22 starts to enter chamber 4 |
| −0.1 sec. | shutter means 66 is closed to the opening size needed for slug 9A to pass therethrough and shutter means 68 is open for passage of slug 9B |
| −0.5 sec. | slugs 9A and 9B enter changer |
| −0.4 sec. | shutter means 66 and 68 start to close tightly |
| −.01 sec. | shutter means 66 and 68 are closed tightly |
| −.0001 sec. | explosive assembly becomes critical |
| 0.0 sec. | instant of maximum energy production |
| 0.1 sec. | sprays 20, 22, and 24 are terminated |
| 1.0 sec. | valves 78 open |
| 2.0 sec. | pool 26 at highest level; next cycle is commenced |
| (−18.0 sec.) | with movement of large mass into dropping means, etc. |
| 3.0 sec. | means 68 begins operation as surface level of pool 26 falls below tops of bottom lips 28 |

It should be noted that the heat exchanger-precipitator means 30 will be operated continuously as are the slurry transport means 34 and 38. Other processing and/or fabricating means will be either batch or continuously operated as is more appropriate.

Computer control and regulation of the various systems will provide satisfactory and safe operation of the reactor system of this invention.

In the preferred embodiment, each explosion cycle results in the production of about 12 grams of fission products with the net consumption of about a gram or so of plutonium. There could be a net increase in fissile uranium isotopes therein of about seven grams ($U^{233}$ increases while $U^{235}$ slightly decreases). Thus, this reactor system produces about $5.0 \times 10^{10}$ watts of thermal power while it converts spent uranium fuel from light water reactors into enriched uranium fuel for light water reactors producing about $7 \times 10^{10}$ watts of thermal power.

By reducing the thickness of shells 80, 81, 112, and 114 and increasing the thickness of shells 82 and 116, the reactor system can be caused to consume more plutonium and produce slightly more enriched uranium therefrom. However, the enriched uranium therefrom will contain a higher fraction of $U^{232}$ therein than will be present in the enriched uranium from the preferred embodiment. That is because there will be more reactions with very fast neutrons which change $Th^{232}$ into $Th^{231}$ which then transmutes into $Pa^{231}$. When $Pa^{231}$ absorbs a neutron, it becomes $Pa^{232}$ which decays into $U^{232}$. $U^{232}$ with a half-life of 72 years, decays into $Th^{228}$ which has a half-life of 1.9 years and decays into short half-life isotopes. After the decay of $Th^{228}$, within a week or so, there are four alphas, two betas and lots of gammas with the end product of stable $Pb^{208}$. Thus, enriched uranium containing much $U^{232}$ will be too "hot" to handle by means now employed in the fabrication of light water reactor fuels. Such "hotness" might be an advantage in some anti-proliferation schemes.

It should be understood that this invention might be practiced with substantial parametric modifications, such as larger or smaller explosions, shorter or longer times for cycles, more or less fissile and/or fertile actinides therein, and different materials used. For example, the reactor system could be operated without thorium as a system for breeding plutonium. In such a system the magnesium will be a solvent for the separation of plutonium from the insoluble uranium metal.

Such a plutonium breeding system might be able to overcome a possible plutonium-shortage crunch which could develop if the world has a great expansion of plutonium-fueled reactors such as the molten sodium fast neutron breeder reactor.

I claim:

1. A method of producing energy and isotopes within a containing chamber, said method comprising the steps of:
   introducing a large, sub-critical mass having an opening therethrough into the containing chamber, said mass having an enclosed neutron reflecting slurry means surrounding a layered centroid portion;
   propelling first and second sub-critical slugs into said chamber from generally opposite directions for intercepting said mass to cause a reaction for the production of thermal energy and neutrons; and
   introducing material into the chamber to absorb said thermal energy and isotopes and protect said chamber from damage.

2. The method of claim 1 wherein said step of propelling first and second sub-critical slugs causes said slugs to intercept said large, sub-critical mass in a more than prompt critical assembly to produce an explosion.

3. The method of claim 2 wherein the step of introducing material comprises spraying lean slurry into said chamber for substantially surrounding said assembly at the instant of explosion.

4. The method of claim 3 including:
   collecting said slurry after each explosion; and
   extracting thermal energy and isotopes from said slurry.

5. The method of claim 4 including transporting said collected and cooled slurry for reintroduction into said chamber.

6. The method of claim 2 wherein the step of introducing a large sub-critical mass comprises releasing said mass for descent by gravitational acceleration into said chamber with said opening substantially vertically aligned.

7. The method of claim 6 wherein the step of propelling first and second sub-critical slugs comprises:
   propelling said first slug generally vertically downward after release of said mass to travel into said opening at a high velocity; and
   propelling said second slug generally vertically upward after release of said mass to travel into said opening at a high velocity;
   whereby said first and second slugs collide within a central region of said mass to interact with each other and said mass for producing said explosion.

8. Apparatus for producing thermal energy and isotopes, said apparatus comprising:
   a containing chamber;
   a large mass having an opening extending therethrough, said mass having an enclosed neutron reflecting slurry means surrounding a layered centroid portion;
   first and second slugs;
   means for introducing said mass into said chamber;
   means for propelling said first and second slugs into said chamber in generally opposite directions for concurring within said opening and forming an assembly for producing thermal energy and neutrons; and
   means for absorbing thermal energy and neutrons and protecting said chamber.

9. The apparatus of claim 8 wherein said large mass is sub-critical, each of said first and second slugs is sub-critical, and a more than prompt critical assembly is formed only upon concurrence of said mass with both of said first and second slugs.

10. The apparatus of claim 9 wherein said assembly explodes upon concurrence of said mass with said first and second slugs.

11. Apparatus as in claim 10 wherein said mass is introduced with its opening generally vertically aligned.

12. Apparatus as in claim 11 said slug propelling means comprises:
    first gun means for propelling said first slug vertically downward; and
    second gun means for propelling said second slug vertically upward.

13. Apparatus as in claim 10 wherein said large mass comprises shell means comprising metal hydrides, said inner shell means thereof containing actinide hydrides.

14. Apparatus as in claim 13 including a shell of uranium metal positioned within said inner shell means.

15. Apparatus as in claim 14 wherein each of said slug comprises:
    a first portion including plutonium at a forward end thereof;
    a second portion of uranium metal adjacent to said first portion; and
    a third portion of metal hydrides adjacent to said second portion, a forward section of said third portion containing actinide hydrides.

16. Apparatus as in claim 15 wherein collision of said first and second slugs within the opening of said mass produces general coincidence of:
    said first and second portions with said shell of uranium metal; and
    said third portions with said shell means.

17. Apparatus as in claim 15 including a region of reduced density in said first portion.

18. Apparatus as in claim 17 wherein said region is hollow.

19. Apparatus as in claim 17 wherein said region is porous.

20. Apparatus as in claim 8 wherein said absorbing and protecting means comprises spray means for introducing copeous quantities of slurry into said chamber to substantially surround said large mass and slugs upon concurrence.

21. Apparatus as in claim 20 including:
    means at the bottom of said chamber for collecting said slurry, and removing thermal energy and solid materials therefrom; and
    means for returning said slurry for reintroduction into said chamber.

22. Apparatus as in claim 21 including means for processing said solid materials for the construction of masses and slugs.

23. Apparatus as in claim 8 wherein said mass comprises:
    a central solid portion;
    an outer shell; and
    a large region of fluid between said central region and said outer shell.

24. A method of producing uranium enriched with $U^{233}$, said method comprising the steps of:

introducing a large, sub-critical mass having an opening therethrough into the containing chamber, said mass having an enclosed neutron reflecting slurry means surrounding a layered centroid portion;

propelling first and second sub-critical slugs into said chamber from generally opposite directions for intercepting said mass to cause a reaction for the production of thermal energy and neutrons; and introducing material into the chamber to absorb said thermal energy and isotopes and protect said chamber from damage.

25. The method of claim 24 wherein said step of propelling first and secon sub-critical slugs causes said slugs to intercept said large, sub-critical mass in a more than prompt critical assembly to produce an explosion.

26. The method of claim 24 wherein the step of introducing material comprises spraying lean slurry into said chamber for substantially surrounding said assembly at the instant of explosion.

27. The method of claim 26 including:
collecting said slurry after each explosion; and
extracting thermal energy and isotopes from said slurry.

28. The method of claim 27 including transporting said collected and cooled slurry for reintroduction into said chamber.

29. The method of claim 25 wherein the step of introducing a large sub-critical mass comprises releasing said mass for descent by gravitational acceleration into said chamber with said opening substantially vertically aligned.

30. The method of claim 29 wherein the step of propelling first and second sub-critical slugs comprises:
propelling said first slug generally vertically downward after release of said mass to travel into said opening at a high velocity; and
propelling said second slug generally vertically upward after release of said mass to travel into said opening at a high velocity;
whereby said first and second slugs collide within a central region of said mass to interact with each other and said mass for producing said explosion.

31. Apparatus for producing uranium enriched with $U^{233}$, said apparatus comprising:
a containing chamber;
a large mass having an opening extending therethrough, said mass having an enclosed neutron reflecting slurry means surrounding a layered centroid portion;
first and second slugs;
means for introducing said mass into said chamber;
means for propelling said first and second slugs into said chamber in generally opposite directions for concurring within said opening and forming an assembly for producing thermal energy and neutrons; and
means for absorbing thermal energy and neutrons and protecting said chamber.

32. The apparatus of claim 31 wherein said large mass is sub-critical, each of said first and second slugs is sub-critical, and a more than prompt-critical assembly is formed only upon concurrence of said mass with both of said first and second slugs.

33. The apparatus of claim 32 wherein said assembly explodes upon concurrence of said mass with said first and second slugs.

34. Apparatus as in claim 33 wherein said mass is introduced with its opening generally vertically aligned.

35. Apparatus as in claim 34 said slug propelling means comprises:
first gun means for propelling said first slug vertically downward; and
second gun means for propelling said second slug vertically upward.

36. Apparatus as in claim 31 wherein said absorbing and protecting means comprises spray means for introducing copeous quantities of slurry into said chamber to substantially surround said large mass and slugs upon concurrence.

37. Apparatus as in claim 36 including:
means at the bottom of said chamber for collecting said slurry, and removing thermal energy and solid materials therefrom; and
means for returning said slurry for reintroduction into said chamber.

38. Apparatus as in claim 37 including means for processing said solid materials for the construction of masses and slugs.

39. Apparatus as in claim 31 wherein said mass comprises:
a central solid portion;
an outer shell; and
a large region of fluid between said central region and said outer shell.

40. Apparatus for producing energy and isotopes, said apparatus comprising:
a containing chamber;
a large free-falling sub-critical mass, said mass having an enclosed neutron reflecting slurry means surrounding a layered centroid portion;
at least one sub-critical slug means;
means for introducing said mass into said chamber;
means for propelling said slug means to concur with said large mass for forming an assembly to produce thermal energy and neutrons; and
means for absorbing thermal energy and protecting said chamber;
said large mass comprising a core containing actinides, rigid, fragile shell means connected to said core, and slurry means substantially surrounding said core within said shell means.

41. Apparatus as in claim 40 wherein said large mass includes strut means for handling said large mass without damaging said fragile shell means before insertion of said slurry means.

42. Apparatus as in claim 40 wherein said means for introducing said mass into said chamber includes means for holding and dropping said large sub-critical mass without damage to said fragile shell and substantially without twisting or turning of said large sub-critical mass.

43. A nuclear energy release assembly for the production of useful energy and isotopes,
said assembly comprising:
a centroid portion comprising plutonium;
a layer of uranium substantially surrounding said centroid portion;
a layer of uranium hydride outside said uranium layer;
a layer of thorium hydride around said uranium hydride layer; and
a neutron moderating reflecting slurry means surrounding said centroid portion and layers.

44. The nuclear energy release assembly of claim 43 wherein said neutron moderating reflecting means comprises a layer containing non-actinide hydrides.

45. The nuclear energy release assembly of claim 43 wherein said device is exploded by assembly of components, said components comprising:
   a relatively large mass having said layers and having a substantially cylindrical opening therethrough such that said mass does not contain said centroid portion;
   a first slug for insertion at a first end portion of said opening and having corresponding layers for alignment with the layers of said mass; and
   a second slug for insertion at a second end portion of said opening and having corresponding layers for alignment with the layers of said mass;
   each slug containing a quantity of plutonium at a forward portion thereof such that said centroid portion is formed upon alignment of the layers of said mass and slugs.

46. The nuclear energy release assembly of claim 46 wherein said neutron moderating reflecting means comprises:
   a generally elipsoidal chamber in said relatively large mass containing liquid moderator means; and
   an elongate bore therethrough for receiving said first and second slugs.

* * * * *